United States Patent

[11] 3,619,779

| [72] | Inventors | Willy Kisselmann<br>Grunwald;<br>Fritz Rumpelein, Guido-Schneble; Paul<br>Kopf, Unterhaching, all of Germany |
|---|---|---|
| [21] | Appl. No. | 810,587 |
| [22] | Filed | Mar. 26, 1969 |
| [45] | Patented | Nov. 9, 1971 |
| [73] | Assignee | AGFA-Gevaert AG<br>Leverkusen, Germany |
| [32] | Priority | Mar. 30, 1968 |
| [33] | | Germany |
| [31] | | P 17 66 083.2 |

[54] UNBALANCED COIL ASSEMBLY FOR MOVING-COIL INSTRUMENTS
9 Claims, 1 Drawing Fig.

| [52] | U.S. Cl. | 324/154 PB |
|---|---|---|
| [51] | Int. Cl. | G01r 1/00 |
| [50] | Field of Search | 324/125, 151, 151 A, 154, 154.1, 155; 116/136.5 |

[56] References Cited
UNITED STATES PATENTS

| 1,979,289 | 11/1934 | Smith | 116/136.5 |
|---|---|---|---|
| 2,478,734 | 8/1949 | Abraham | 116/136.5 X |
| 727,041 | 5/1903 | Weston | 324/154.1 |
| 2,388,897 | 11/1945 | Ammon | 324/155 |

Primary Examiner—Alfred E. Smith
Attorney—Michael S. Striker

ABSTRACT: An unbalanced coil assembly for use in moving-coil instruments comprises a frame which carries the coil, two coaxial staffs, a pointer and platelike balance weight. When the coil assembly is mounted for turning movement about the common axis of its staffs and when such axis is located in a horizontal plane, the balance weight is caused by gravity to move to a level below the staffs. This balance weight extends beyond the outline of the frame so that some of its material can be removed by one or more milling or like tools until the coil assembly is properly balanced.

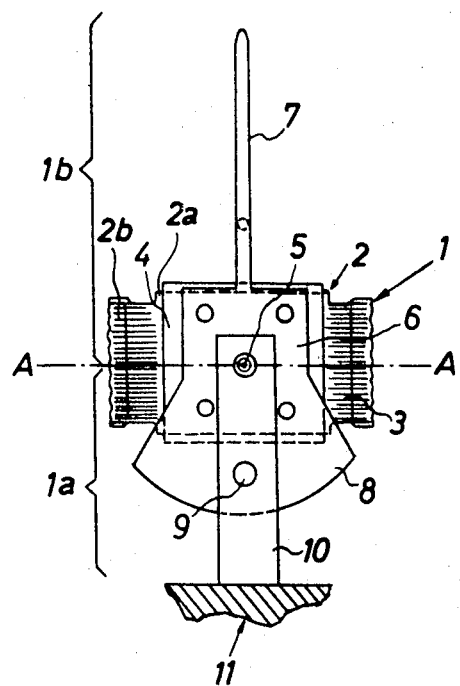

UNBALANCED COIL ASSEMBLY FOR MOVING-COIL INSTRUMENTS

BACKGROUND OF THE INVENTION

The present invention relates to moving-coil instruments for use in photographic apparatus, sound recording and/or reproducing apparatus or the like. More particularly, the invention relates to improvements in coil assemblies of such instruments, especially to improvements in the production of unbalanced coil assemblies and to a method of balancing such assemblies.

In accordance with presently prevailing practice, the coil assembly of a moving-coil instrument is balanced by adding material to its balance weight, for example, by applying one or more drops of molten solder to a balance weight which is normally integral with the pointer. Such procedure is time consuming and unreliable because it is very difficult to insure that a small droplet of solder is applied to a predetermined portion of the balance weight and because it is even more difficult to determine the exact weight of each droplet or droplets. Consequently, such method of balancing the coil assembly is based on trial and error and must be carried out by skilled persons.

SUMMARY OF THE INVENTION

An object of our invention is to provide a semifinished coil assembly for moving-coil instruments which can be balanced more rapidly, more accurately and in a simpler way than presently known coil assemblies.

Another object of the invention is to provide a coil assembly wherein the balance weight is mounted and configurated in a novel way to insure rapid and accurate balancing of the coil assembly in simple and readily available machinery.

A further object of the invention is to provide a coil assembly which need not be balanced by addition of material to its balance weight.

Still another object of the invention is to provide a coil assembly which can be balanced by semiskilled persons.

The invention is embodied in an unbalanced (semifinished) coil assembly for moving-coil instruments (for example, galvanometers which are used in exposure meters of photographic apparatus or in sound recording or reproducing apparatus) which comprises a frame, a coil convoluted around the frame, a pair of coaxial pivot members or staffs supported by and extending from opposite sides of the frame, and a balance weight (preferably a metallic plate which is integral with the customary pointer) carried by the frame and located at one side of a symmetry plane which includes the common axis of the pivot members. The weight of that portion of the coil assembly which is located at the one side of such symmetry plane and includes the balance weight exceeds the weight of that portion of the coil assembly which is located at the other side of the symmetry plane so that the balance weight is invariably caused by gravity to assume a position at a level below the pivot members when the pivot members are mounted in a material removing machine for turning movement in horizontal position of their common axis. When the coil assembly (in such position of its pivot members) comes to rest, the symmetry plane coincides with the aforementioned horizontal plane.

The balance weight preferably extends beyond the outline of the frame and the coil thereon so that it can be readily engaged by a milling, grinding or other suitable material removing tool which removes therefrom material until the coil assembly is properly balanced so that it remains in any desired angular position with reference to the common axis of its pivot members.

The novel features which are considered as characteristic of the invention are set forth in particular in the appended claims. The improved coil assembly itself, however, both as to its construction and the mode of assembling and balancing the same, together with additional features and advantages thereof, will be best understood upon perusal of the following detailed description of certain specific embodiments with reference to the accompanying drawing.

BRIEF DESCRIPTION OF THE DRAWING

The single FIGURE is a side elevational view of an unbalanced coil assembly which embodies the invention, the assembly being shown in a position it assumes prior, during or subsequent to balancing.

DESCRIPTION OF THE PREFERRED EMBODIMENTS

The drawing shows an unbalanced or semifinished coil assembly 1 which comprises a hollow rectangular frame 2 supporting a convoluted coil 3. The frame 2 has two elongated sidewalls 2a (located one behind the other, as viewed in the drawing) and two transversely extending end walls 2b located in planes making an angle of 90° with the plane of the drawing. The convolutions of the coil 3 are located in parallel horizontal planes, as viewed in the drawing.

The frame 2 supports two substantially plate like carrier 4 each of which is outwardly adjacent to one of the sidewalls 2a and each of which overlaps the corresponding portion of the coil 3. Each of the carrier 4 supports a pivot member or staff 5. These pivot members have a common axis and each thereof extends outwardly from the respective carrier 4. One of the carriers 4 is connected with a platelike metallic holder 6 which is integral with a pointer 7 and with a platelike balance weight 8. As shown, a portion of the balance weight 8 extends well beyond the outline of the frame 2 and coil 3. The manner in which the carriers 4 can be connected to the frame 2 and the manner in which the holder 6 can be connected with the corresponding carrier 4 is disclosed in the copending application, Serial No. 810,585 of Kisselmann et al., entitled "Coil assembly for moving-coil instruments."

The numeral 10 denotes one of two supporting brackets which form part of a material removing machine 11. These brackets support the pivot members 5 for turning movement about a horizontal axis. In accordance with a feature of our invention, the mass of the balance weight 8 is selected in such a way that, when the pivot members 5 are mounted in their brackets 10 in a manner as shown in the drawing, the balance weight is caused by gravity to move to a level below the symmetry plane A—A which includes the axis of the pivot members 5 and is parallel with the planes of convolutions of the coil 3. This symmetry plane A—A extends at right angles to the planes of sidewall and end wall 2a, 2b of the frame 2. Such tendency of the balance weight 8 to move to a level below the pivot members 5 is due to the fact that the weight of the lower portion 1a of the coil assembly 1 (this portion 1a includes the balance weight 8, substantially one-half of the frame 2 and coil 3, and substantially one-half of each of the carriers 4) invariably exceeds the weight of the upper portion 1b of the coil assembly. The portion 1b includes the pointer 7. It is immaterial whether or not the pointer 7 extends vertically upwardly or makes an oblique angle with the plane A—A when the coil assembly 1 is at rest in the illustrated position.

When the coil assembly 1 is at rest in the position shown in the drawing, a milling, grinding, boring or other material removing tool can be moved into engagement with the balance weight 8 to remove therefrom some material (for example, in the region indicated by the circle 9) until the coil assembly is properly balanced, i.e., until the coil assembly can dwell in any desired angular position with reference to the common axis of the pivot members 5. The material removing tool or tools are preferably moved in a direction at right angles to the plane of the platelike balance weight 8 and preferably remove material from that portion of the balance weight which extends beyond the outline of the frame 2 and coil 3. Removal of material can be carried out in one, two or more stages until the coil assembly 1 is properly balanced.

It is preferred to employ a back support or anvil (not shown) which is moved against one side of the downwardly extending portion of the balance weight 8 while the tool or tools move against the other side of the balance weight to remove therefrom material in one or more stages. Such back support reduces the likelihood of deformation or other damage to the pivot members 5 during removal of material from the balance weight 8. The back support further reduces the likelihood of deformation of the balance weight during engagement with one or more tools.

The weight of the portion 1a of the coil assembly 1 preferably exceeds the weight of the portion 1b by such a value that the balance weight 8 invariably assumes the illustrated position when the pivot members 5 are free to turn in a horizontal plane, regardless of eventual tolerances in the machining of parts of which the coil assembly consists. Thus, the mass of the balance weight 8 should be selected in such a way that the coil assembly assumes the illustrated position even if the weight of the pointer 7 exceeds considerably the normal weight of such part and even if the weight of the balance weight 8 is considerably less than normally. Removal of more or less material from the balance weight is just as easy if the tool or tools must remove a relatively large or a relatively small quantity of such material. Therefore, the balance weight is preferably overdimensioned to make sure that it automatically moves to the illustrated position when the pivot members 5 are properly mounted in the brackets 10 or like supports.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended

1. A balanced coil assembly for moving-coil instruments, comprising a frame; a coil convoluted around said frame; a pair of coaxial pivot members supported by and extending outwardly from opposite sides of said frame; and a plate constituting a balance weight, said plate being carried by said frame and being located at one side of a symmetry plane which includes the common axis of said pivot members, said plate having at least one weakened portion as a result of removal of material from the plate for the purpose of balancing said coil assembly, the weight of that portion of said assembly which is located at one side of said symmetry plane and includes said plate being equal to the weight of that portion of said assembly which is located at the other side of said plane so that said assembly remains in any selected angular position when said pivot members are mounted for turning movement in a horizontal position of their common axis.

2. A coil assembly as defined in claim 1 wherein said plate extends beyond the outline of said frame.

3. A coil assembly as defined in claim 1, wherein said coil comprises a plurality of substantially parallel convolutions and wherein said symmetry plane is substantially parallel to the planes of said convolutions.

4. A coil assembly as defined in claim 1, wherein said frame comprises a pair of elongated substantially parallel sidewalls and a pair of shorter end walls extending substantially transversely of said sidewalls, said pivot members extending outwardly from said sidewalls and said symmetry plane being substantially normal to said walls.

5. A coil assembly as defined in claim 1, further comprising a pointer located at said other side of said symmetry plane and being rigid with said plate.

6. A coil assembly as defined in claim 5, wherein said pointer is integral with said plate.

7. A coil assembly as defined in claim 1, further comprising a pair of carriers connected with said frame and each supporting one of said pivot members.

8. A coil assembly as defined in claim 7, further comprises a pointer rigid with said plate, said pointer and said plate being supported by one of said carriers.

9. A coil assembly as defined in claim 8, further comprising a platelike holder integral with said pointer and said first mentioned plate and connected to said one carrier.

* * * * *